US009573207B2

(12) United States Patent
Sugita et al.

(10) Patent No.: US 9,573,207 B2
(45) Date of Patent: Feb. 21, 2017

(54) RECIPROCATING CUTTING TOOL

(71) Applicant: MAKITA CORPORATION, Anjo-shi, Aichi-ken (JP)

(72) Inventors: Fumihide Sugita, Anjo (JP); Toshiyuki Kani, Anjo (JP); Kenji Abe, Anjo (JP); Kenta Niwa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 246 days.

(21) Appl. No.: 14/256,399

(22) Filed: Apr. 18, 2014

(65) Prior Publication Data

US 2014/0331506 A1 Nov. 13, 2014

(30) Foreign Application Priority Data

May 9, 2013 (JP) ................................. 2013-099581
Jan. 30, 2014 (JP) ................................. 2014-015821

(51) Int. Cl.
*B23D 49/16* (2006.01)
*B23D 51/16* (2006.01)

(52) U.S. Cl.
CPC ............. *B23D 49/16* (2013.01); *B23D 49/162* (2013.01); *B23D 51/16* (2013.01)

(58) Field of Classification Search
CPC ........ B23D 49/16; B23D 49/162; B23D 51/16
See application file for complete search history.

(56) References Cited

U.S. PATENT DOCUMENTS

| 3,203,090 A | * | 8/1965 | Jepson | ..................... B26B 19/02 30/34.1 |
| 3,971,132 A | * | 7/1976 | Griffies | ................ B23D 49/162 30/393 |
| 4,137,632 A | * | 2/1979 | Pfanzer | ................ B23D 49/162 30/393 |
| 4,145,811 A | | 3/1979 | Kendzior | |
| 4,240,204 A | * | 12/1980 | Walton, II | ............ B23D 49/162 30/393 |

(Continued)

FOREIGN PATENT DOCUMENTS

CN       1939660 A    4/2007
DE   602004005272 T2  11/2007

(Continued)

OTHER PUBLICATIONS

Aug. 19, 2015 Office Action issued in Chinese Patent Application No. 201410172062.0.

(Continued)

*Primary Examiner* — Hwei C Payer
(74) *Attorney, Agent, or Firm* — Oliff PLC

(57) ABSTRACT

A jigsaw includes a motor, a rod having a blade attached thereto, a power transmission portion that converts rotation transmitted from the motor to vertical movement of the rod to vertically move the blade, and a counterweight that moves vertically in a direction of the vertical movement of the rod outside a range of the vertical, movement of the rod and the blade. At least a part of the counterweight is disposed so as to cross an extended line of a trajectory of the vertical movement of the rod. The counterweight moves vertically independently of the vertical movement of the rod which is produced by the power transmission portion.

9 Claims, 12 Drawing Sheets

(56) References Cited

U.S. PATENT DOCUMENTS

| | | | | |
|---|---|---|---|---|
| 4,262,421 A * | 4/1981 | Bergler | ............... | B23D 49/165 30/393 |
| 4,512,078 A * | 4/1985 | Pfanzer | ............... | B23D 49/165 30/393 |
| 4,628,605 A * | 12/1986 | Clowers | ............... | B23D 49/165 30/393 |
| 5,025,562 A * | 6/1991 | Palm | ............... | B23D 49/162 30/392 |
| 5,050,307 A | 9/1991 | Palm | | |
| 5,205,043 A * | 4/1993 | Batt | ............... | B23D 59/006 30/393 |
| 5,555,626 A * | 9/1996 | Fuchs | ............... | B23D 51/16 30/392 |
| 5,644,846 A * | 7/1997 | Durr | ............... | B23D 49/165 30/393 |
| 7,526,868 B2 * | 5/2009 | Oki | ............... | B23D 49/162 30/392 |
| 8,201,337 B2 * | 6/2012 | Tam | ............... | B23D 49/167 30/392 |
| 8,656,598 B2 * | 2/2014 | Kaiser | ............... | B23D 49/165 30/376 |
| 8,668,026 B2 * | 3/2014 | Aoki | ............... | B25D 17/245 173/162.1 |
| 2004/0117993 A1 * | 6/2004 | Armstrong | ............... | B23D 51/16 30/392 |
| 2005/0087353 A1 * | 4/2005 | Oki | ............... | B25D 17/043 173/162.2 |
| 2005/0132583 A1 * | 6/2005 | Bednar | ............... | B23D 51/16 30/392 |
| 2007/0074408 A1 * | 4/2007 | Zhang | ............... | B23D 51/10 30/392 |
| 2010/0180455 A1 * | 7/2010 | Haas | ............... | B23D 49/162 30/392 |
| 2011/0100665 A1 * | 5/2011 | Nakashima | ............... | B23D 51/01 173/162.2 |
| 2011/0247223 A1 * | 10/2011 | Kani | ............... | B23D 49/162 30/392 |
| 2012/0192440 A1 * | 8/2012 | Jerabek | ............... | B23D 49/165 30/393 |
| 2014/0331506 A1 * | 11/2014 | Sugita | ............... | B23D 49/16 30/392 |
| 2015/0367494 A1 * | 12/2015 | Wang | ............... | B25F 5/006 30/392 |

FOREIGN PATENT DOCUMENTS

| | | |
|---|---|---|
| DE | 102008002212 A1 | 12/2009 |
| DE | 102010038343 A1 | 2/2011 |
| DE | 102009046374 A1 | 4/2011 |
| DE | 102012210678 A1 | 1/2014 |
| JP | A-11-5201 | 1/1999 |
| JP | A-2001-347502 | 12/2001 |
| JP | A-2011-115912 | 6/2011 |

OTHER PUBLICATIONS

Mar. 6, 2015 Office Action issued in German Application No. ISH114-23566DE.

* cited by examiner

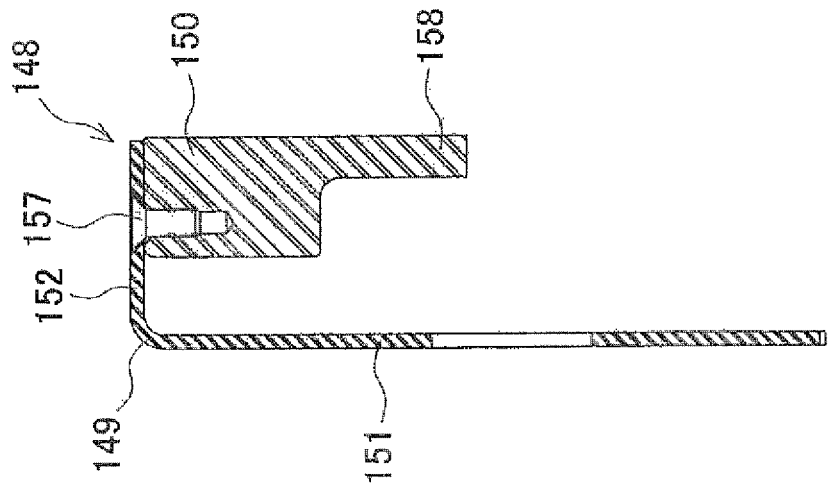
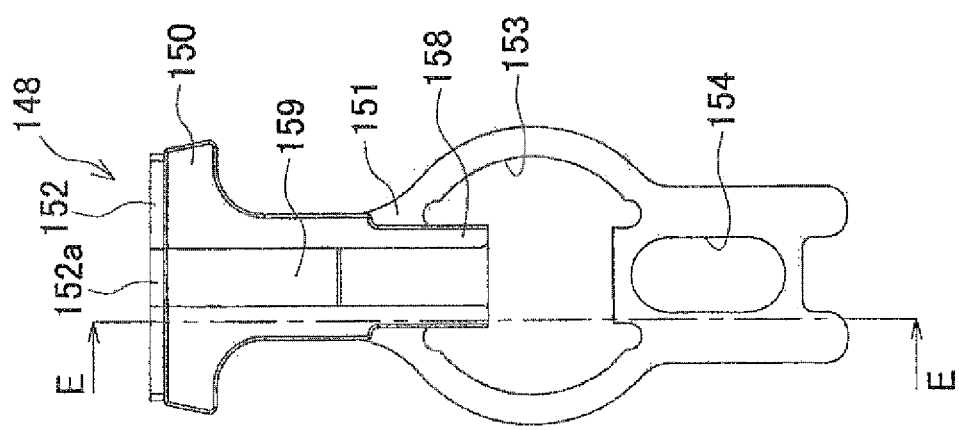

RECIPROCATING CUTTING TOOL

BACKGROUND OF THE INVENTION

This application claims the benefit of Japanese Patent Application Number 2013-099581 filed on May 9, 2013, and Japanese Patent Application Number 2014-015821 filed on Jan. 30, 2014, the entirety of which is incorporated by reference.

Field of the Invention

The present invention relates to reciprocating cutting tools that cut a workpiece by reciprocating a blade, such as jigsaws.

Description of Related Art

As shown in Japanese Patent Application Publication No. 2001-347502 (JP 2001-347502 A), a reciprocating saw is known which includes a detachable saw blade (blade), a plunger (rod) capable of linearly reciprocating along a vertical reference line, and a balance weight capable of linearly reciprocating above the plunger along the reference line.

Each of the plunger and the balance weight has a guide member protruding rearward. A gear is disposed so as to receive these guide members with a common elliptic guide groove. As the gear rotates, each guide member is guided by the guide groove. The plunger and the balance weight are located closest to each other when the guide members are located at intersections with the minor axis of the guide groove. The plunger and the balance weight are located farthest from each other when the guide members are located at intersections with the major axis of the guide groove. The plunger and the balance weight thus reciprocate at symmetrical positions.

As shown in Japanese Patent Application Publication No. 2011-115912 (JP 2011-115912 A), a reciprocating tool is known which rotates a gear having, in its front part, a gear eccentric portion and a needle controller located on the opposite side to the gear eccentric portion, and which vertically reciprocates a plunger via a sleeve receiving the needle roller and a connector, and vertically reciprocates a balance weight via an elliptic hole receiving the gear eccentric portion.

The gear eccentric portion is shorter in a longitudinal direction than the needle roller of the gear, and the balance weight is mounted rearward of the plunger and a blade.

The balance weight is formed by two separate portions, namely a base portion and a weight portion disposed in front of the base portion. The weight portion is made relatively heavy so that the position of the overall center of gravity of the balance weight is located more in the front part. This suppresses the rearward or forward moment as shown in FIGS. 10 and 11 of Japanese Patent Application Publication No. 2011-115912 (JP 2011-115912 A).

In the reciprocating saw of Japanese Patent Application Publication No. 2001-347502 (JP 2001-347502 A), the plunger and the saw blade are aligned with the balance weight in the vertical direction, and are not shifted with respect to the balance weight in the longitudinal direction. Accordingly, rearward or forward moment is not generated, and vibration can be easily suppressed.

However, the plunger and the balance weight need to be placed so as to adjoin the gear, and therefore the blade cannot be swung in the longitudinal direction. Accordingly, the blade cannot make orbital motion (longitudinal swinging together with vertical movement), and the cutting force cannot be increased. Moreover, since both the guide member of the plunger and the guide member of the balance weight are received by the single guide groove formed in the single gear, the vertical movement of the plunger is not independent of the vertical movement of the balance weight. Namely, the vertical movement of the plunger and the vertical movement of the balance weight are dependent on each other. Therefore, the vertical movement of the plunger and the vertical movement of the balance weight cannot be adjusted independently.

In the reciprocating tool of Japanese Patent Application Publication No. 2011-115912 (JP 2011-115912 A), the position of the center of gravity of the balance weight is located more in the front part, but the entire balance weight is still shifted with respect to the plunger in the longitudinal direction. As a result, rearward or forward moment is generated, and vibration and noise are generated due to the moment.

Such a balance weight is effective in suppressing vibration of the rod if the weight portion having great mass is disposed on an extended line of the rod. However, when the weight portion moves vertically, the longitudinal moment is generated, which may produce vibration. One solution to this problem is to provide a guide member that guides the vertical movement of the weight portion. However, when the weight portion operates in the longitudinal direction, the guiding function of the guide member is degraded. Accordingly, providing such a guide member is not enough to prevent vibration (Japanese Patent Application Publication No. H11-5201 (JP H11-5201 A)).

SUMMARY OF THE INVENTION

It is a primary object of the present invention to provide a reciprocating cutting tool that is capable of suppressing vibration without generating rearward or forward moment, is capable of being used together with an orbital motion mechanism that increases a cutting force, and is capable of further suppressing vibration by making it possible to adjust a vibration suppressing mechanism.

It is another object of the present invention to provide a reciprocating cutting tool capable of effectively preventing vibration resulting from a balance weight.

In order to achieve the above object, a reciprocating cutting tool according to a first aspect of the present invention includes a motor, a rod, a reciprocating mechanism, and a counterweight. The rod has a blade attached thereto. The reciprocating mechanism converts rotation transmitted from the motor to reciprocating movement of the rod to reciprocate the blade. The counterweight reciprocates in a direction of the reciprocating movement of the rod outside a range of the reciprocating movement of the rod and the blade. At least a part of the counterweight is disposed so as to cross an extended line of a trajectory of the reciprocating movement of the rod. The counterweight reciprocates independently of the reciprocating movement of the rod which is produced by the reciprocating mechanism.

According to a second aspect of the present invention, in the above aspect, the counterweight is reciprocated by a counterweight driving eccentric cam, and a part of the counterweight protrudes to a position located on an opposite side of the rod from the counterweight driving eccentric cam.

According to a third aspect of the present invention, in the above aspect, the counterweight has a weight portion and a plate portion supporting the weight portion. The plate portion has a plate base portion extending in the direction of the reciprocating movement of the rod, and a weight support portion protruding from the plate base portion.

According to a fourth aspect of the present invention, in the above aspect, the reciprocating cutting tool further includes a counterweight guide that guides the counterweight.

According to a fifth aspect of the present invention, in the above aspect, the reciprocating mechanism includes a rod driving eccentric cam that is rotated by the motor, and a slider that is reciprocated by the rod driving eccentric cam and supports an end of the rod.

According to a sixth aspect of the present invention, in the above aspect, the reciprocating cutting tool further includes a preload unit that presses the counterweight guide against the counterweight.

According to a seventh aspect of the present invention, in the above aspect, the counterweight is formed by a plate that reciprocates parallel to the rod reciprocating in a vertical direction and a weight that is attached to the plate. The counterweight guide is provided in front of the weight and is pressed against the weight by the preload unit disposed in front of the counterweight guide.

According to an eighth aspect of the present invention, in the above aspect, the preload unit is an elastic body that line-contacts the counterweight guide.

According to a ninth aspect of the present invention, in the above aspect, a plurality of types of the elastic bodies are provided.

According to a tenth aspect of the present invention, in the above aspect, the counterweight guide has elasticity, and is used also as one of the elastic bodies.

According to an eleventh aspect of the present invention, in the above aspect, the weight has a groove in which the counterweight guide is fitted.

According to a twelfth aspect of the present invention, in the above aspect, one end of the counterweight guide in a direction of the reciprocating movement of the counterweight is fixed and the other end thereof is a free end. The counterweight guide is pressed against the counterweight by the elastic body.

According to a thirteenth aspect of the present invention, in the above aspect, the rod and the counterweight reciprocate in a vertical direction, and when the counterweight is located at a top dead center, the elastic body is located above a position of a lower end of the weight contacting the counterweight guide.

According to a fourteenth aspect of the present invention, in the above aspect, the rod and the counterweight reciprocate in the vertical direction, and the weight has a suspended portion formed in its front part so as to protrude downward.

According to the first aspect of the present invention, the reciprocating movement of the rod and the reciprocating movement of the counterweight can be adjusted independently. Even if the rod is allowed to swing in order to cause the blade to make orbital motion, the counterweight can be operated while preventing generation of rearward or forward moment. This can appropriately suppress vibration and noise.

According to the second aspect of the present invention, in addition to the above advantage, the center of gravity of the counterweight can be located on the extended line of the trajectory of the reciprocating movement of the rod or at a position adjoining the extended line. This can prevent generation of the rearward or forward moment and can suppress noise and vibration.

According to the third aspect of the present invention, in addition to the above advantage, the center of gravity of the counterweight can be located on the extended line of the trajectory of the reciprocating movement of the rod or at a position adjoining the extended line by using a simple structure. This can easily suppress noise and vibration.

According to the fourth aspect of the present invention, in addition to the above advantage, the reciprocating movement of the counterweight is stabilized, and noise and vibration can further be suppressed.

According to the fifth aspect of the present invention, in addition to the above advantage, the rod can be easily swung, and the rod is not reciprocated beyond the slider, which provides space. Therefore, the counterweight can be easily placed at such a position that is effective in suppressing vibration and noise.

According to the sixth aspect of the present invention, in addition to the above advantage, vibration resulting from the counterweight can be effectively prevented because the preload unit is provided so as to press the counterweight guide against the counterweight.

According to the seventh aspect of the present invention, in addition to the above advantage, satisfactory assembling workability is achieved because the counterweight guide is provided in front of the weight that reciprocates in the vertical direction, and is pressed against the weight by the preload unit disposed in front of the counterweight guide.

According to the eighth aspect of the present invention, in addition to the above advantage, a preload can be easily applied to the counterweight guide because the elastic body is used as the preload unit.

According to the ninth aspect of the present invention, in addition to the above advantage, vibration can be more effectively suppressed by different natural frequencies because the plurality of types of the elastic bodies are provided.

According to the tenth aspect of the present invention, in addition to the above advantage, a reasonable structure having a small number of parts can be implemented because the counterweight guide has elasticity and is used also as one of the elastic bodies.

According to the eleventh aspect of the present invention, in addition to the above advantage, the vertical movement of the weight can be guided by the counterweight guide, and further, the counterweight can be prevented from being shifted in the lateral direction, because the weight has the groove in which the counterweight guide is fitted.

According to the twelfth aspect of the present invention, in addition to the above advantage, a stable preload can be applied to the counterweight guide because one end of the counterweight guide in a direction of the reciprocating movement of the counterweight is fixed and the other end thereof is a free end, and the counterweight guide is pressed against the counterweight by the elastic body.

According to the thirteenth aspect of the present invention, in addition to the above advantage, a buffering effect can be obtained when the counterweight moves downward from the top dead center, because the elastic body is located above the position of the lower end of the weight contacting the counterweight guide when the counterweight is located at the top dead center.

According to the fourteenth aspect of the present invention, in addition to the above advantage, a longitudinal thickness can be reduced and a compact configuration can be achieved because the weight has the downward protruding suspended portion in its front part.

BRIEF DESCRIPTION OF THE DRAWINGS

FIG. 9A is a front view of the counterweight and FIG. 9B is a sectional view taken along line E-E in FIG. 9A.

DETAILED DESCRIPTION OF THE EMBODIMENTS

Embodiments of the present invention and modifications thereof will be described below with reference to the drawings. The present invention is not limited to the embodiments and the modifications thereof.

Figure 1:
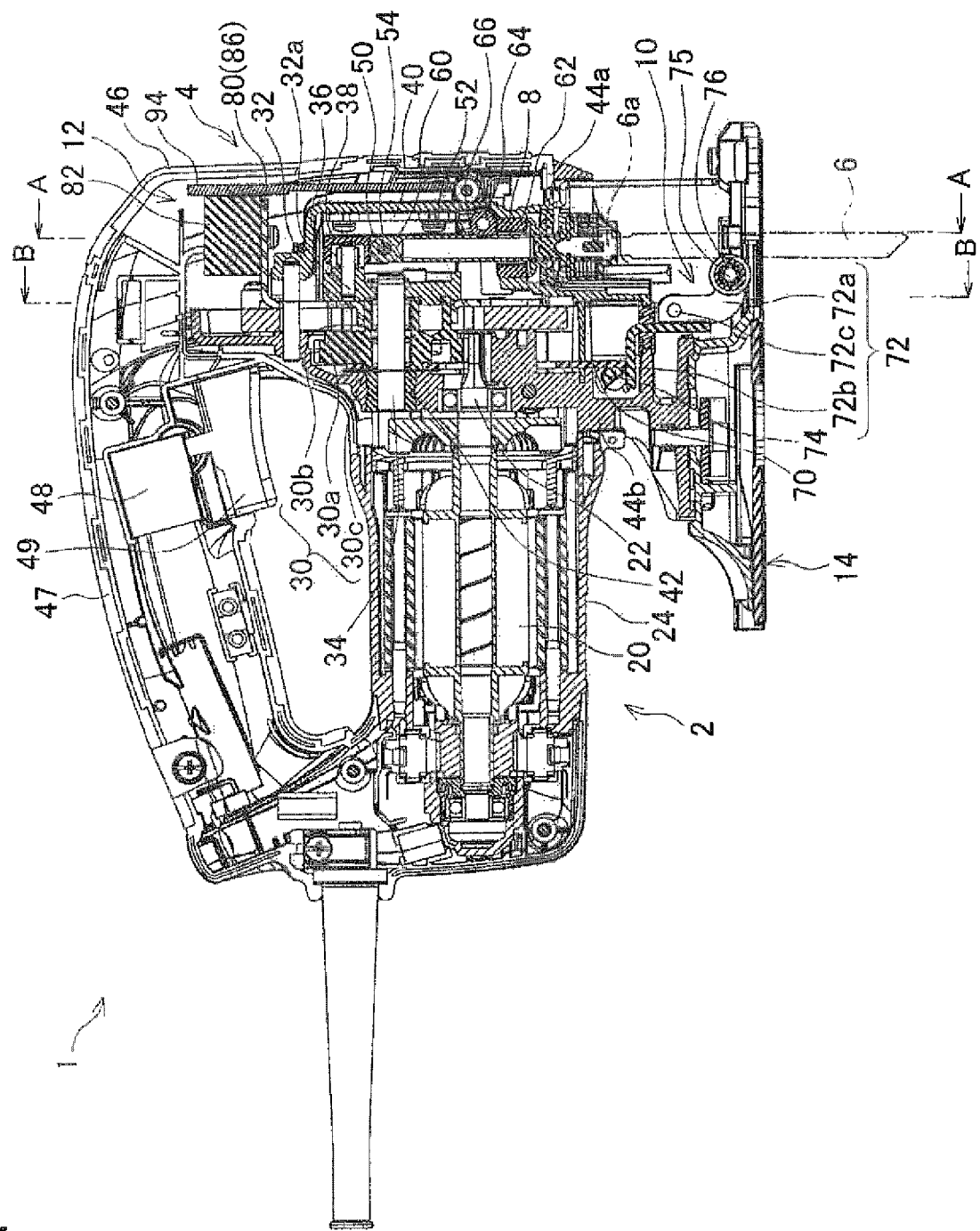
FIG. 1 is a central longitudinal section of a jigsaw according to the present invention.
Figure 2:
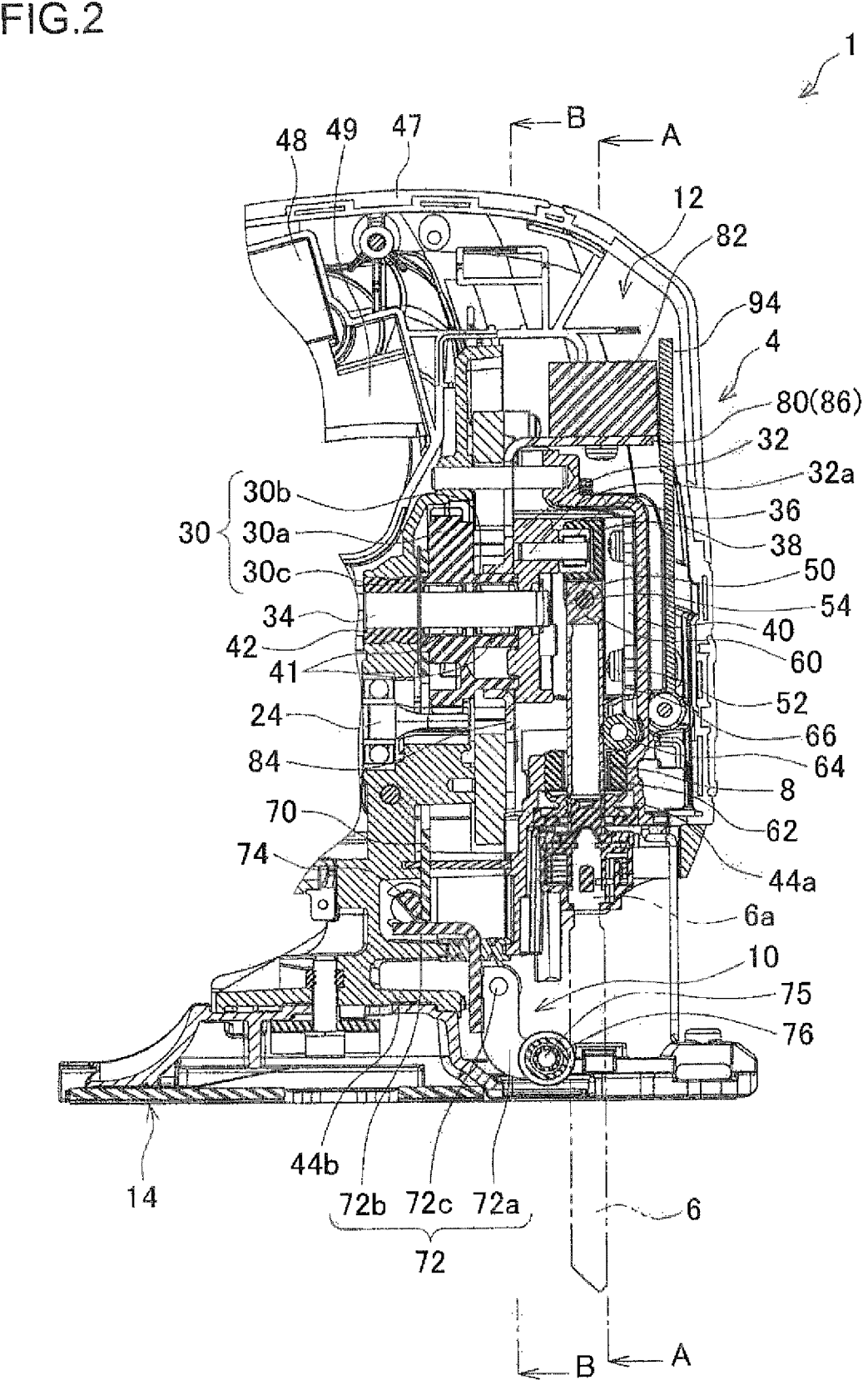
FIG. 2 is an enlarged view of the front part of FIG. 1.
Figure 3:
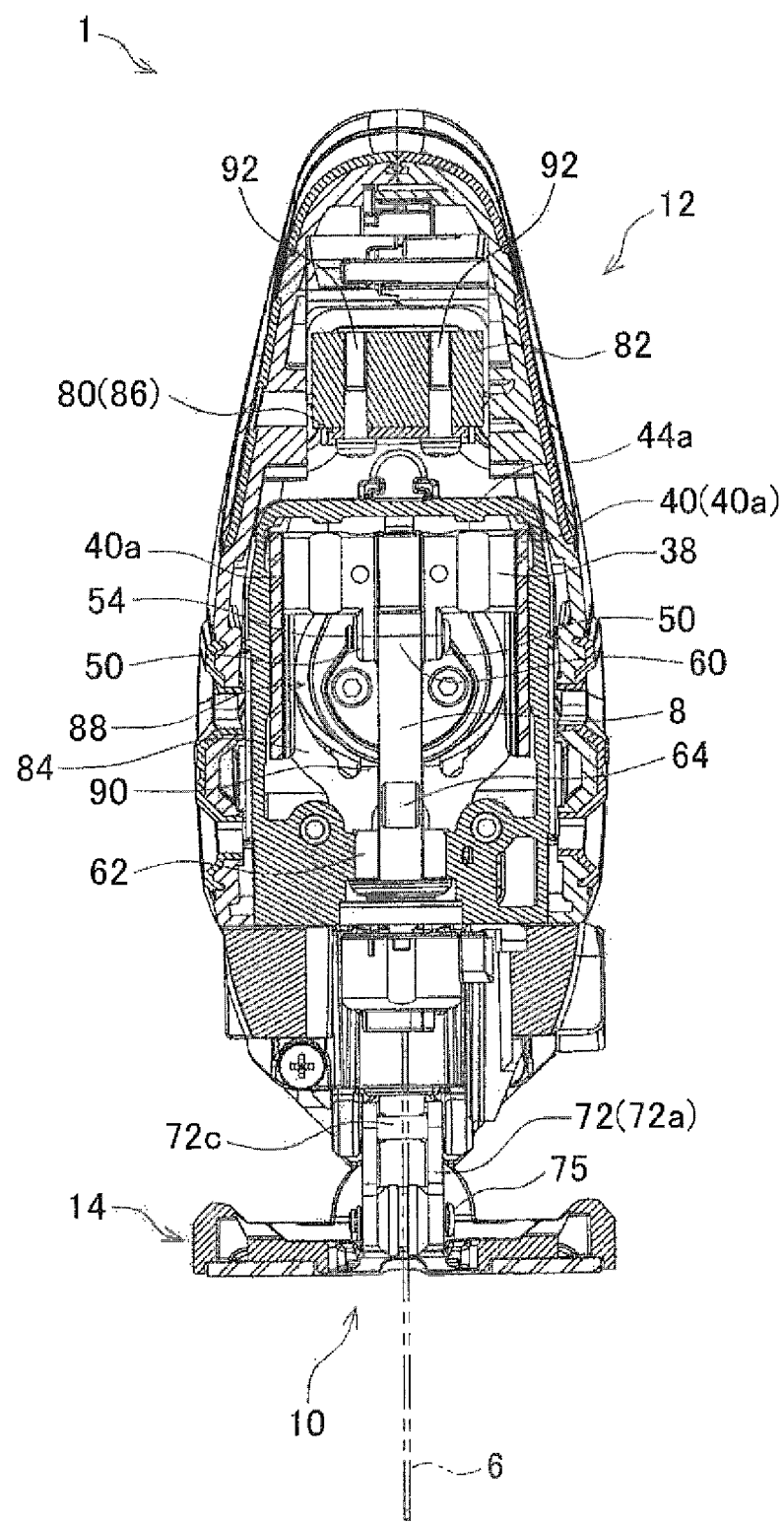
FIG. 3 is a sectional view taken along line A-A in FIGS. 1 and 2.
Figure 4:
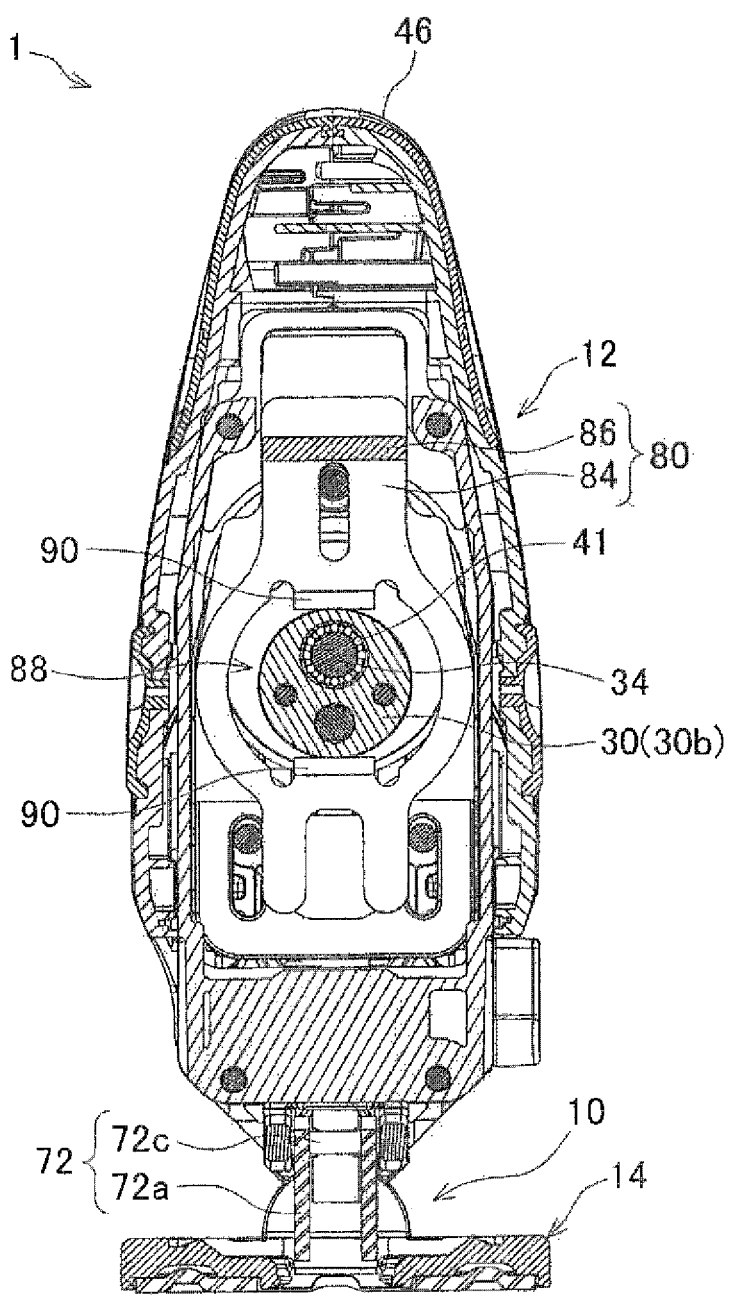
FIG. 4 is a sectional view taken along line B-B in FIGS. 1 and 2.

FIG. 1 is a central longitudinal section of a jigsaw 1 as an example of a reciprocating cutting tool. FIG. 2 is an enlarged view of a front part of FIG. 1, FIG. 3 is a sectional view taken along line A-A (a restricting roller 64 described below has been added), and FIG. 4 is a sectional view taken along line B-B. The right side in FIGS. 1 and 2 is the front side of the jigsaw 1, the upper side in FIGS. 1 and 2 is the upper side of the jigsaw 1, the right side in FIGS. 3 and 4 is the left side of the jigsaw 1, and the upper side in FIGS. 3 and 4 is the upper side of the jigsaw 1.

The jigsaw 1 has a power portion 2, a power transmission portion 4 serving as a reciprocating mechanism, a rod 8 that vertically moves (vertically reciprocates) a blade 6 attached thereto, an orbital motion mechanism 10 that swings the vertically moving blade 6 in the longitudinal direction to cause the blade 6 to make elliptic orbital motion, a counterweight 12 for the blade 6 and the rod 8 which are vertically moved, and a base 14.

The power portion 2 has an electric motor 20. A rotary shaft 22 of the motor 20 is disposed in the front part of the motor 20. The rotary shaft 22 has teeth formed in its tip end.

The motor 20 is accommodated in a motor housing 24.

The power transmission portion 4 has an intermediate gear 30 having teeth that mesh with teeth in the tip end of the rotary shaft 22, a crank plate 32 disposed in front of the intermediate gear 30, a support shaft 34 extending through the respective central portions of the intermediate gear 30 and the crank plate 32 in the longitudinal direction, a guide roller 36 attached so as to protrude forward from a peripheral edge portion of the front surface of the crank plate 32, a slider 38 receiving the guide roller 36 so that the guide roller 36 can reciprocate laterally, and a guide block 40 receiving the slider 38 so that the slider 38 can move vertically.

The intermediate gear 30 is disposed above the rotary shaft 22, and can rotate about the support shaft 34. Bearings 41, 41 are interposed between the intermediate gear 30 and the support shaft 34. The intermediate gear 30 is formed so that a first eccentric boss portion 30b protrudes forward from the front part of a disc-shaped base portion 30a and a second eccentric boss portion 30e protrudes rearward from the rear part of the base portion 30a. The first eccentric boss portion 30b and the second eccentric boss portion 30c are offset in the same direction with respect to the center of rotation of the intermediate gear 30 (the support shaft 34), and the first eccentric boss portion 30b is offset to a larger degree compared to the second eccentric boss portion 30c. The teeth of the intermediate gear 30 are formed in the peripheral surface of the base portion 30a. Since the diameter (the number of teeth) of the base portion 30a is larger than the diameter (the number of teeth) of the rotary shaft 22 of the motor 20, rotation transmitted from the rotary shaft 22 is reduced in speed by the intermediate gear 30.

The crank plate 32 is attached to the front end of the intermediate gear 30 (the first eccentric boss portion 30b), and can together with the intermediate gear 30 rotate about the support shaft 34.

The support shaft 34 is accommodated between a front gear housing 44a and a rear gear housing 44b, and is fixed to the rear gear housing 44b via a bush 42. The respective upper parts of the front gear housing 44a and the rear gear housing 44b are accommodated in a body housing 46. The upper part of the body housing 46 is formed in a loop shape, and is formed as a handle 47. A switch 48 and a trigger 49 that turns on and off the switch 48 are accommodated in the handle 47. The lower part of the trigger 49 is exposed from the handle 47 (to the inside of the loop). The switch 48 is electrically connected to the motor 20 and a power cord (not shown) by a lead wire (not shown).

The guide roller 36 is attached at a position offset with respect to the center of rotation of the crank plate 32. The guide roller 36 is offset in the opposite direction to that in which the first eccentric boss portion 30b is offset (is disposed so as to form an angle of 180° with the first eccentric boss portion 30b). The guide roller 36 is rotatably supported by a shaft 32a and can rotate laterally. The shaft 32a is attached so as to protrude forward from the front part of the peripheral portion of the crank plate 32, and is integral with the crank plate 32.

The slider 38 is a member extending in the lateral direction and being longer in the lateral direction than in the vertical direction. The slider 38 has a groove extending in the lateral direction and having a U-shaped section opening rearward, and the groove receives the guide roller 36. The guide roller 36 can move along the groove of the slider 38 by rotating in the groove.

Bulging edges bulging outward are provided on both right and left sides of the groove of the slider 38. Right and left support pieces 50, 50 protruding downward are provided on the central portion of the lower surface of the slider 38 (the lower side of the groove). Each support piece 50 has a hole formed in the lateral direction.

The guide block 40 is a member having right and left guide grooves 40a, 40a having a U-shaped section opening inward. Each guide groove 40a has a front wall portion, a sidewall portion, and a rear wall portion (the front wall portion is shown in FIG. 3).

The guide block 40 is fixed to the front gear housing 44a via bolts 52, 52.

Each guide groove 40a receives the left or right bulging edge of the slider 38. The slider 38 is attached to the guide block 40 so that the slider 38 can move vertically while being guided by the guide grooves 40a, 40a.

A single support shaft 54 extending in the lateral direction passes through the support pieces 50, 50 of the slider 38. The hole in each support piece 50 has the same diameter as the support shaft 54, and the support shaft 54 is fixed to the support pieces 50, 50.

As the crank plate 32 rotates and the guide roller 36 is displaced (revolves), the vertical, displacement component of the guide roller 36 is transmitted to the slider 38, and the slider 38 moves vertically along the guide block 40 via the guide roller 36 accordingly. The lateral displacement component of the revolution of the guide roller 36 is not transmitted to the slider 38 because the guide roller 36 rotates and reciprocates laterally inside the slider 38.

The rod 8 is a member having the shape of a prism extending vertically (a quadrilateral prism having two longitudinal surfaces and two lateral surfaces). The rod 8 has a hole in a rod upper end 60, and the support shaft 54 of the slider 38 extends through the hole. This hole has the same diameter as the support shaft 54, and the support shaft 54 is not fixed to this hole. The rod 8 is attached to the slider 38 so that the rod 8 can swing about the support shaft 54. The slider 38 supports the upper end of the rod 8 so that the rod 8 can swing. The interval between the support pieces 50, 50 of the slider 38 is the same as the lateral width of the upper end of the rod 8, and (each of the left and right surfaces of) the rod 8 contacts (the inner surfaces of) the support pieces 50, 50. This prevents lateral backlash of the rod 8.

The rod 8 is accommodated in the front gear housing 44*a* via a bush 62 such that predetermined swinging and vertical movement of the rod 8 are permitted. The bush 62 has a cylindrical shape, and is disposed so that its inner surface adjoins the outer surface of the lower part of the rod 8.

The rod 8 has a chuck hole extending from its lower surface and capable of receiving and holding an upper end 6*a* of the blade 6.

The restricting roller 64 that restricts forward swinging of the rod 8 is disposed in front of the rod 8. The restricting roller 64 is attached to the tip end of a leaf spring 66, and is constantly pressed against the front surface of the rod 8 with an appropriate pressure. The leaf spring 66 together with the guide block 40 is fixed via the bolt 52.

The orbital motion mechanism 10 includes a cam plate 70 that vertically moves with the movement of the second eccentric boss portion 30*c* of the intermediate gear 30, a holder 72 that is disposed below the cam plate 70, a switch lever 74 that is disposed above the holder 72, and a back roller 76 that is rotatably supported by the holder 72 via a shaft 75.

The cam plate 70 is a plate-like member extending in the vertical and lateral directions. The cam plate 70 has a hole in its upper part. This hole has the same diameter as the second eccentric boss portion 30*c*, and the second eccentric boss portion 30*c* extends through this hole. As the intermediate gear 30 rotates and the second eccentric boss portion 30*c* rotationally moves, the cam plate 70 also rotationally moves about the hole in its upper part (moves vertically and laterally). Since the amount of offset of the second eccentric boss portion 30*c* is relatively small, the amount of movement of the cam plate 70 is also relatively small.

The holder 72 has a hold portion 72*a* curved forward and having a J-shape as viewed from the side, and an arm piece 72*b* extending rearward from the upper part of the hold portion 72*a*. The holder 72 is swingably supported by a shaft 72*c* in the upper end of the hold portion 72*a*. The shaft 72*c* is fixed to the rear gear housing 44*b*. The back roller 76 is disposed in the lower front part of the hold portion 72*a*. The lower end of the cam plate 70 can contact the upper side of the arm piece 72*b*. The vertical movement of the cam plate 70 repeatedly presses the lower end of the cam plate 70 against the arm piece 72*b*, whereby the holder 72 swings.

The switch lever 74 is a semicylindrical member extending in the lateral direction. When the switch lever 74 is operated so that its curved surface faces downward (its flat surface faces upward), the curved surface contacts the upper part of the arm piece 72*b*, preventing the holder 72 from swinging. When the switch lever 74 is operated so that its curved surface faces upward, the curved surface is separated from the upper part of the arm piece 72*b*, allowing the holder 72 to swing.

The back roller 76 can rotate along the rear side of the blade 6, and can press the blade 6 from behind.

The guide roller 36 is attached at the position that is offset in the opposite direction to that in which the second eccentric boss portion 30*c* is offset. Accordingly, in the case where the switch lever 74 is switched to allow the holder 72 to swing, and the rod 8 moves upward, the cam plate 70 moves downward, and the back roller 76 swings forward via the holder 72. When the rod 8 moves downward, the cam plate 70 moves upward to be separated from the holder 72, and the back roller 76 returns from the advanced swing position to a swing start position as a rearward position. Thus, the back roller 76 presses the blade 6 forward as the blade 6 moves upward. When the blade 6 moves downward, the back roller 76 does not press the blade 6 and causes the blade 6 to make orbital motion.

The counterweight 12 has a plate 80 serving as a plate portion that moves vertically with the movement of the first eccentric boss portion 30*b* of the intermediate gear 30, and a weight 82 serving as a weight portion that is supported by the plate 80.

The plate 80 has a cam plate portion 84 (plate base portion) extending in the vertical and lateral directions, and a horizontal weight attachment portion 86 (weight support portion) protruding forward from the upper part of the cam plate portion 84.

The cam plate portion 84 has a cam hole 88 in its central portion. Horizontal cam pieces 90, 90 protruding rearward are provided in the upper and lower parts of the opening of the cam hole 88. Each of the cam pieces 90, 90 contacts the upper or lower part of the outer surface of the first eccentric boss portion 30*b*. The lateral dimension of the cam hole 88 is designed so as to permit the rotational movement (movement in the lateral direction) of the first eccentric boss portion 30*b*. That is, the lateral dimension of the cam hole 88 is designed so that the first eccentric boss portion 30*b* can be located in the cam hole 88 even when the largest eccentric part of the first eccentric boss portion 30*b* is located on the left (right) side.

As the intermediate gear 30 rotates and the first eccentric boss portion 30*b* is displaced, the vertical displacement component of the first eccentric boss portion 30*b* is transmitted to the cam pieces 90, 90 and the plate 80 together with the weight 82 moves vertically accordingly. The lateral displacement component of the first eccentric boss portion 30*b* is not transmitted to the plate 80 because the first eccentric boss portion 30*b* slides in the cam hole 88 along the cam pieces 90, 90.

The weight attachment portion 86 of the plate 80 is disposed so that there still is an interval even when the weight attachment portion 86 is located closest to the rod 8 and the slider 38 (the state shown in the figure). The weight attachment portion 86 of the plate 80 is thus disposed so as to move vertically out of the range of the vertical movement of the rod 8 and the slider 38. The upper part of the front gear housing 44*a* is located between the weight attachment portion 86 and the rod 8. The weight attachment portion 86 of the plate 80 is not located below the rod 8, and moves vertically out of the range of the vertical movement of the blade 6.

The weight 82 is a block-like metal member. The weight 82 is attached by placing the weight 82 on the weight attachment portion 86 of the plate 80 and tightening bolts 92, 92 from underneath.

The weight 82 is disposed above the rod 8.

The weight of the weight 82 is set so that the weight of the weight 82 and the plate 80 (the total weight of the members that move vertically based on the first eccentric boss portion 30*b*) is balanced with the weight of the rod 8, the blade 6, and the slider 38 (the total weight of the members that move vertically based on the guide roller 36).

A part of the weight 82 and a part of the weight attachment portion 86 are located forward of the rod 8. That is, the weight 82 and the weight attachment portion 86 protrude forward beyond the rod 8 to a position located on the opposite side of the rod 8 from the side on which the first eccentric boss portion 30*b* is disposed. The longitudinal center position (the position of the center of gravity) of the weight 82 is located forward of the longitudinal center position of the rod 8. With this arrangement, the position of the overall center of gravity of the weight 82 and the plate 80 is located immediately above the rod 8. That is, at least a part of the counterweight 12 is located so as to cross an extended line (reference line) of a trajectory of the vertical movement (swinging is not taken into consideration) of the rod 8, and the center of gravity of the counterweight 12 is located on the extended line of the trajectory of the vertical movement of the rod 8 or a position adjoining the extended line.

A metal guide plate 94 extending in the vertical, and lateral directions is disposed in front of the weight 82. The guide plate 94 has a rear surface (counterweight guide surface) corresponding to the front surface (flat surface) of the weight 82, and the front surface of the weight 82 contacts the rear surface of the guide plate 94. The guide plate 94 is attached to the body housing 46 by fixing the bottom end of the guide plate 94 to the body housing 46. The guide plate 94 is disposed in front of the front gear housing 44*a*.

The guide roller 36 is attached at the position that is offset in the opposite direction to that in which the first eccentric boss portion 30*b* is offset. Accordingly, when the rod 8 moves upward, the counterweight 12 moves downward (the state shown in the figure). When the rod 8 moves downward, the counterweight 12 moves upward. The rod 8 and the counterweight 12 thus move vertically in the opposite directions to each other (with a phase difference of 180°). Accordingly, the weight attachment portion 86 and the weight 82 of the counterweight 12 and the rod 8 move vertically so that the weight attachment portion 86 and the weight 82 of the counterweight 12 and the rod 8 are located symmetrically with respect to an intermediate horizontal plane therebetween. The weight attachment portion 86 of the counterweight 12 is located above the rod 8. There is an interval between the weight attachment portion 86 of the counterweight 12 and the rod 8 and the slider 38, and the weight attachment portion 86 of the counterweight 12 does not contact the rod 8 and the slider 38. The counterweight 12 thus moves vertically out of the range of the vertical movement of the blade 6 and the rod 8.

The counterweight 12 (the weight attachment portion 86 of the plate 80 and the weight 82) is disposed above the rod 8 so as to cross the direction in which the rod 8 moves vertically.

The weight of the rod 8 is substantially the same as that of the counterweight 12.

Vibration that is produced by the vertical movement of the rod 8 is thus cancelled and suppressed by the vertical movement of the counterweight 12.

The amount of offset, the phase, etc. can be set independently for the crank plate 32 and the guide roller 36 (the rod driving eccentric cam) and the first eccentric boss portion 30*b* of the intermediate gear 30 (the counterweight driving eccentric cam), and the vertical movement of the rod 8 by the guide roller 36 is independent of the vertical movement of the counterweight 12 by the first eccentric boss portion 30*b*. In other words, in the jigsaw 1, the counterweight 12 is vertically moved by a second eccentric cam (the counterweight driving eccentric cam) different from a first eccentric cam (the rod driving eccentric cam) that vertically moves the rod 8.

The counterweight 12 is moved vertically with the front surface of the weight 82 being in contact with the rear surface of the guide plate 94. Accordingly, even if the weight 82 is subjected to the forward moment, the weight 82 is supported by the guide plate 94, and the vertical movement of the counterweight 12 is maintained.

The base 14 is a member having a substantially flat lower surface. The base 14 is mounted by coupling the upper part of the base 14 to the lower part of the rear housing 44*b*.

An example of the operation of the jigsaw 1 will be described.

The operator attaches the blade 6 to the rod 8 in a stopped state such that saw teeth face forward, and brings the front part of the lower surface of the base 14 into contact with a workpiece. With the power cord being connected to a power supply, the operator holds the handle 47, and operates the trigger 49 to turn on the switch 48. Electric power is thus supplied to the motor 20, whereby the rotary shaft 22 rotates, and the intermediate gear 30 and the crank plate 32 rotate together.

The rotation of the crank plate 32 causes the rod 8 to move vertically via the guide roller 36 and the slider 38. Rotation of the first eccentric boss portion 30*b* of the intermediate gear 30 causes the counterweight 12 to move vertically. Rotation of the second eccentric boss portion 30*c* of the intermediate gear 30 causes the cam plate 70 to move vertically. When the switch lever 74 has been switched to the position where the holder 72 is allowed to swing, the back roller 76 swings via the holder 72. The vertical movement and swinging of these elements are performed the same number of times (once per rotation of the intermediate gear 30 and the crank plate 32).

When swinging, the back roller 76 presses the blade 6 forward as the blade 6 moves upward. When the blade 6 moves downward, the back roller 76 does not press the blade 6 and causes the blade 6 to make orbital motion.

The rod 8 moves vertically with vibration being suppressed by the counterweight 12 that moves vertically in a symmetrical manner with the rod 8.

If the operator presses the handle portion 38 forward with the rod 8 and the blade 6 being in the operating state, the saw teeth on the front side of the vertically moving blade 6 contact the workpiece, whereby the workpiece is cut in the longitudinal direction. In the case where the blade 6 is pressed and is caused to make orbital motion by the back roller 76 to cut the workpiece, the blade 6 is moved upward and pressed forward. Accordingly, a greater cutting force can be obtained (the operator can perform the pressing operation with a smaller force) as compared to the case where the blade 6 is not caused to make orbital motion. In the case where the blade 6 is caused to make orbital motion, the blade 6 pressed forward is subjected to an elastic force of the leaf spring 66 via the restricting roller 64, whereby excessive forward movement of the blade 6 is restricted. When cutting the workpiece, the blade 6 is subjected to a rearward force (cutting resistance) from the workpiece.

If the operator operates the trigger 49 to turn off the switch 48, the rotary shaft 22 of the motor 20 is stopped, and the vertical movement and swinging of the various elements are stopped.

As described above, the jigsaw 1 includes the motor 20, the rod 8 having the blade 6 attached thereto, the power transmission portion 4 that converts rotation transmitted from the motor 20 to vertical movement of the rod 8 to vertically move the blade 6, and the counterweight 12 that moves vertically in the direction in which the rod 8 moves vertically, outside the range of the vertical movement of the rod 8 and the blade 6. At least a part of the counterweight 12 is located so as to cross the extended line of the trajectory of the vertical movement of the rod 8. The counterweight 12 moves vertically independently of the vertical movement of the rod 8 which is produced by the power transmission portion 4.

The vertical movement of the counterweight 12 can thus be adjusted without depending on the vertical movement of the rod 8, and vibration and noise due to the vertical movement of the rod 8 can further be suppressed. The rod 8 can be moved vertically independently of the vertical, movement of the counterweight 12. Even if the rod 8 is allowed not only to move vertically but also to swing in order to cause the blade 6 to make orbital motion, the counterweight 12 can be operated while preventing generation of the rearward or forward moment. This can suppress vibration and noise which can be generated based on the vertical movement of the rod 8 etc. Moreover, since the stroke of the rod 8 and the stroke of the counterweight 12 can be set individually, a sufficient centrifugal force can be generated by the lighter counterweight 12, and vibration and noise can be efficiently suppressed.

The counterweight 12 moves vertically by the first eccentric boss portion 30b, and a part of the counterweight 12 protrudes to a position located on the opposite side of the rod 8 from the first eccentric boss portion 30b.

Accordingly, the counterweight 12 can be driven independently of the rod 8, and the center of gravity of the counterweight 12 can be located on the extended line of the trajectory of the vertical movement of the rod 8 or can be located as close to this extended line as possible. This can prevent generation of the rearward or forward moment in the rod 8 and the counterweight 12, and can suppress noise and vibration in the jigsaw 1.

Moreover, the counterweight 12 has the weight 82 and the plate 80 supporting the weight 82. The plate 80 has the cam plate portion 84 extending in the direction in which the rod 8 moves vertically, and the weight attachment portion 86 protruding from the cam plate portion 84.

By using the simple structure, the center of gravity of the counterweight 12 can thus be located along the direction in which the rod 8 moves vertically, and noise and vibration can be suppressed.

The jigsaw 1 further includes the guide plate 94 that guides the counterweight 12.

This stabilizes the vertical movement of the counterweight 12 (by preventing a situation where the counterweight 12 moves beyond the designed range so that moment is generated), and can effectively suppress noise and vibration.

Furthermore, the power transmission portion 4 has the crank plate 32 and the guide roller 36 which are rotated by the motor 20, and the slider 38 that is reciprocated by the crank plate 32 and the guide roller 36 and supports the upper end of the rod 8.

Accordingly, the rod 8 can be easily swung. The rod 8 is not disposed above the slider 38, which provides space. This makes it easy to place (a part of) the counterweight 12.

The present invention is not limited to the above embodiment. For example, the present invention may be modified as followed.

The intermediate gear and the crank plate may be supported by different shafts. The intermediate gear and the crank plate may be rotated by separate driving sources. The intermediate gear may be integral with the crank plate. The eccentric boss portions may be separate members, may be supported by different shafts, and may be driven by separate driving sources.

The reciprocating direction may be the longitudinal direction, and a part of the counterweight may be located rearward of the rod. In this case, the counterweight driving eccentric cam can be disposed above the rod, and a part of the counterweight can be made to protrude downward beyond the rod.

The weight may be fixed by bonding to the plate. The plate may be integral with the weight. The plate base portion and the weight attachment portion of the plate may be separate members and may be combined. The plate and the weight may be made of a synthetic resin.

The counterweight guide may be a curved surface conforming to the front surface of the weight, may be a protrusion that is received by a groove formed in the weight, may be a member that guides a part other than the weight, or may be an inner surface of any of various housings such as the body housing.

A bearing may be added to the support shaft between the slider and the rod. This bearing may be received by the guide grooves of the guide block.

The rod may have the shape of a cylinder, an elliptic cylinder, a hexagonal prism, etc.

The blade may have a blade other than the saw teeth.

Instead of the power cord, a battery may be used to supply electric power. The battery may be mounted on the body housing etc.

Another embodiment of the present invention will be described below.

Figure 5:
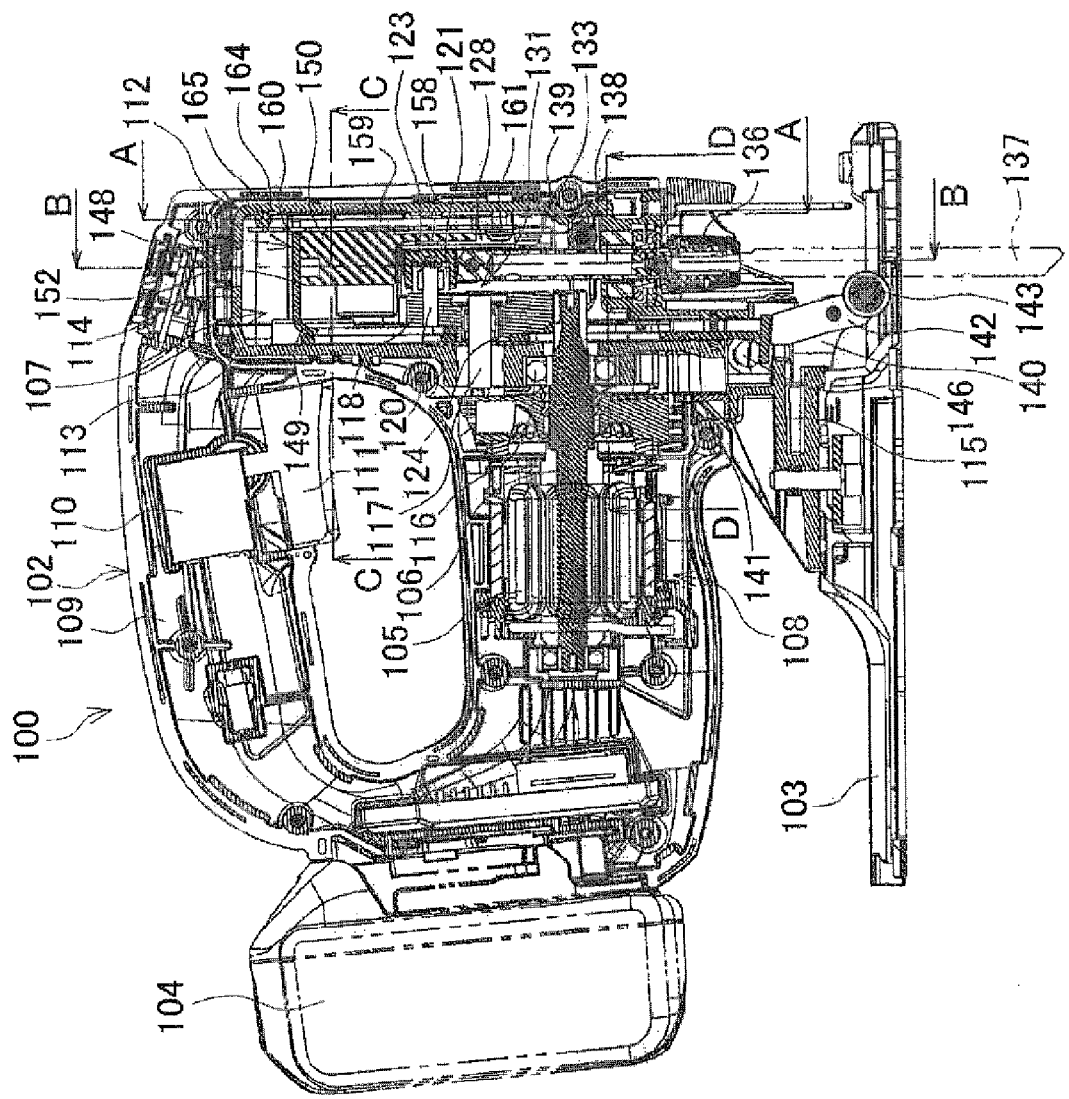
FIG. 5 shows a central longitudinal section of a jigsaw according to another embodiment (a rod is located at the top dead center).
Figure 11:
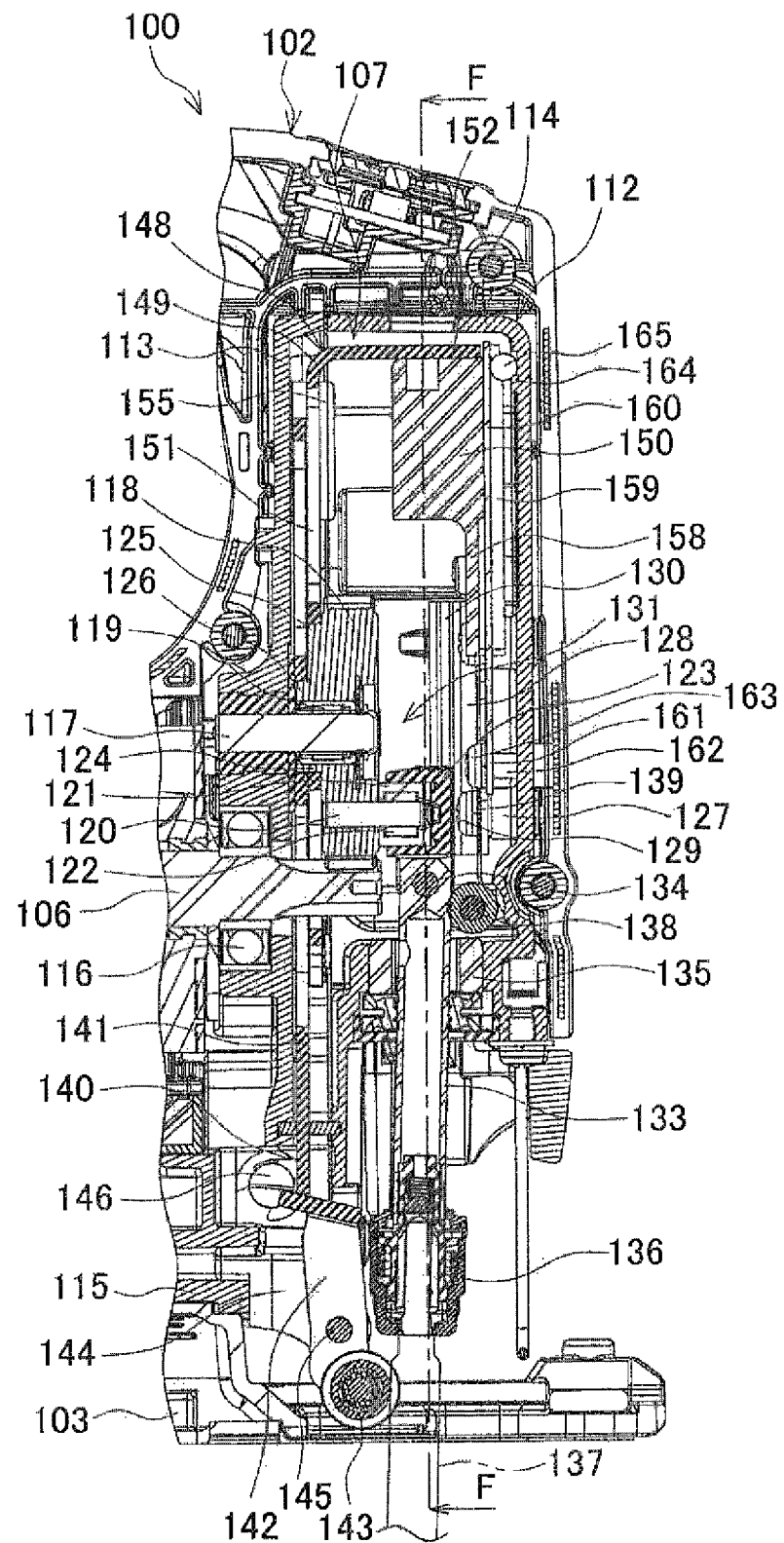
FIG. 11 shows a central longitudinal section of an output portion of the jigsaw (the rod is located at the bottom dead center).
Figure 12:
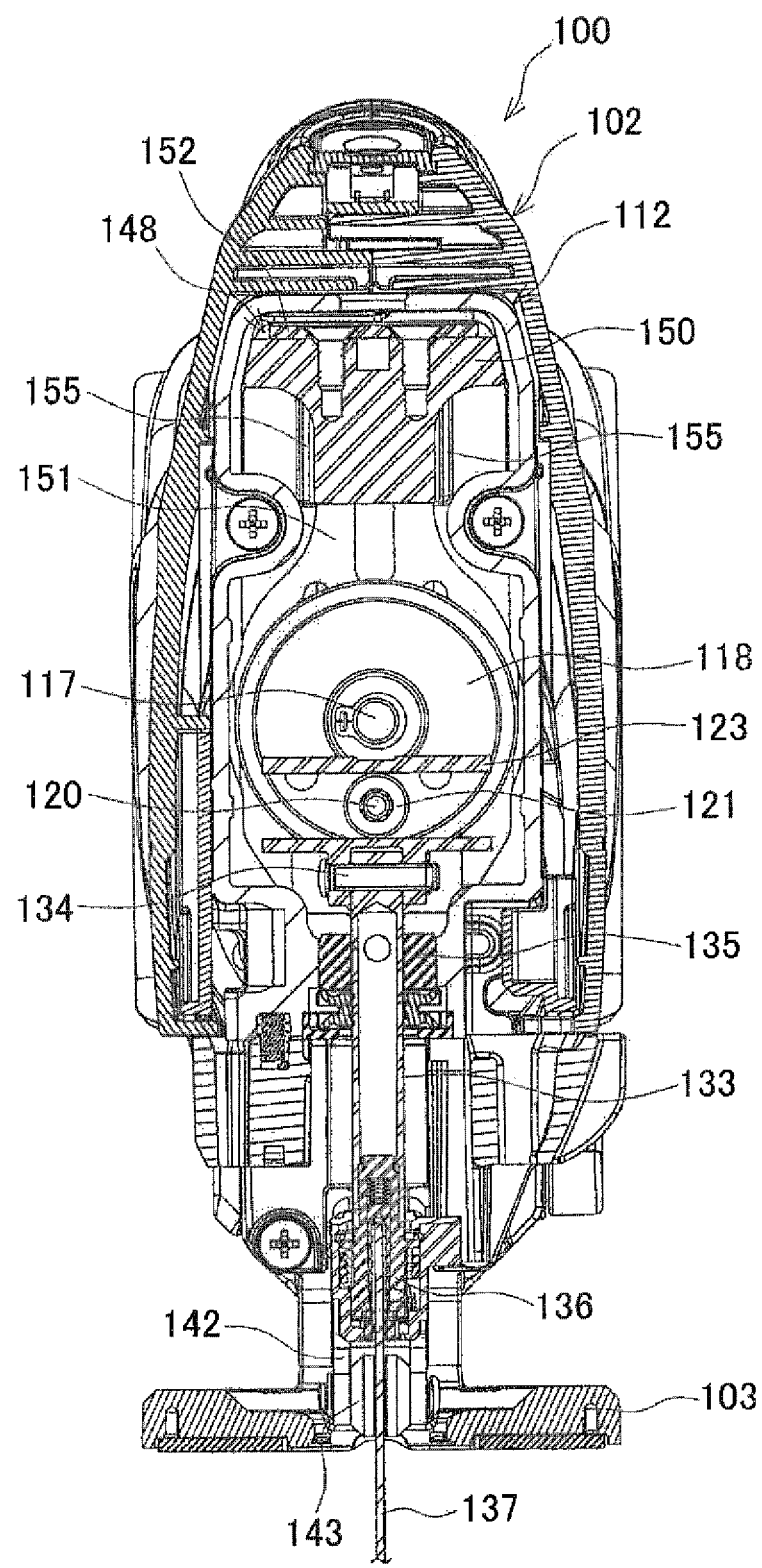
FIG. 12 is a sectional view taken along line F-F in FIG. 11.

FIG. 5 is a central longitudinal section of a jigsaw 100, and FIG. 11 is an enlarged view of an output portion. The rod is located at the top dead center in FIG. 5, and is located at the bottom dead center in FIG. 11. The jigsaw 100 is formed by connecting left and right halved housings, and includes a base 103 below a housing 102 accommodating a motor 105 and an output portion 107. A battery pack 104 serving as a power supply is mounted on the rear part of the housing 102 (the right side in FIG. 5 is the front side).

The motor 105 is accommodated in a motor accommodating portion 108 that extends longitudinally in the lower part of the housing 102. The motor 105 is accommodated in such an attitude that an output shaft 106 extends forward. A loop-shaped handle 109 is formed in the upper part of the housing 102, and a switch 110 including a trigger 111 is accommodated in the handle 109.

An inner housing 112 is provided in front of the motor accommodating portion 108, and the output portion 107 is accommodated in the inner housing 112. The inner housing 112 is formed by connecting a gear housing 113 provided on the rear side and a gear housing cover 114 provided on the front side. The lower part of the gear housing 113 is a coupling portion 115 protruding from the housing 102, and the base 103 is coupled to the coupling portion 115. The output shaft 106 of the motor 105 is rotatably supported by a bearing 116 provided in the gear housing 113, and a pinion formed in the tip end of the output shaft 106 protrudes into the inner housing 112. A support pin 117 parallel to the output shaft 106 is supported above the output shaft 106 in the gear housing 113 so as to protrude into the inner housing 112. A gear 118 meshing with the pinion of the output shaft 106 is rotatably supported by the support pin 117 via a bearing 119. An eccentric pin 120 is fixed and attached at the offset position of the gear 118 so as to extend forward, and a guide roller 121 is rotatably provided on the tip end of the eccentric pin 120 via a bearing 122. The guide roller 121 is held in a slider 123 having a U-shaped transverse section so that the guide roller 121 can roll in the slider 123. The gear 118 has a stepped eccentric boss 124 protruding from its rear surface at an eccentric position with a phase difference of 180° from the eccentric pin 120. The eccentric boss 124 is formed by a first eccentric portion 125 that is located on the base end side and offset by a large amount, and a second eccentric portion 126 that is located on the tip end side and offset by a small amount.

Figure 6:
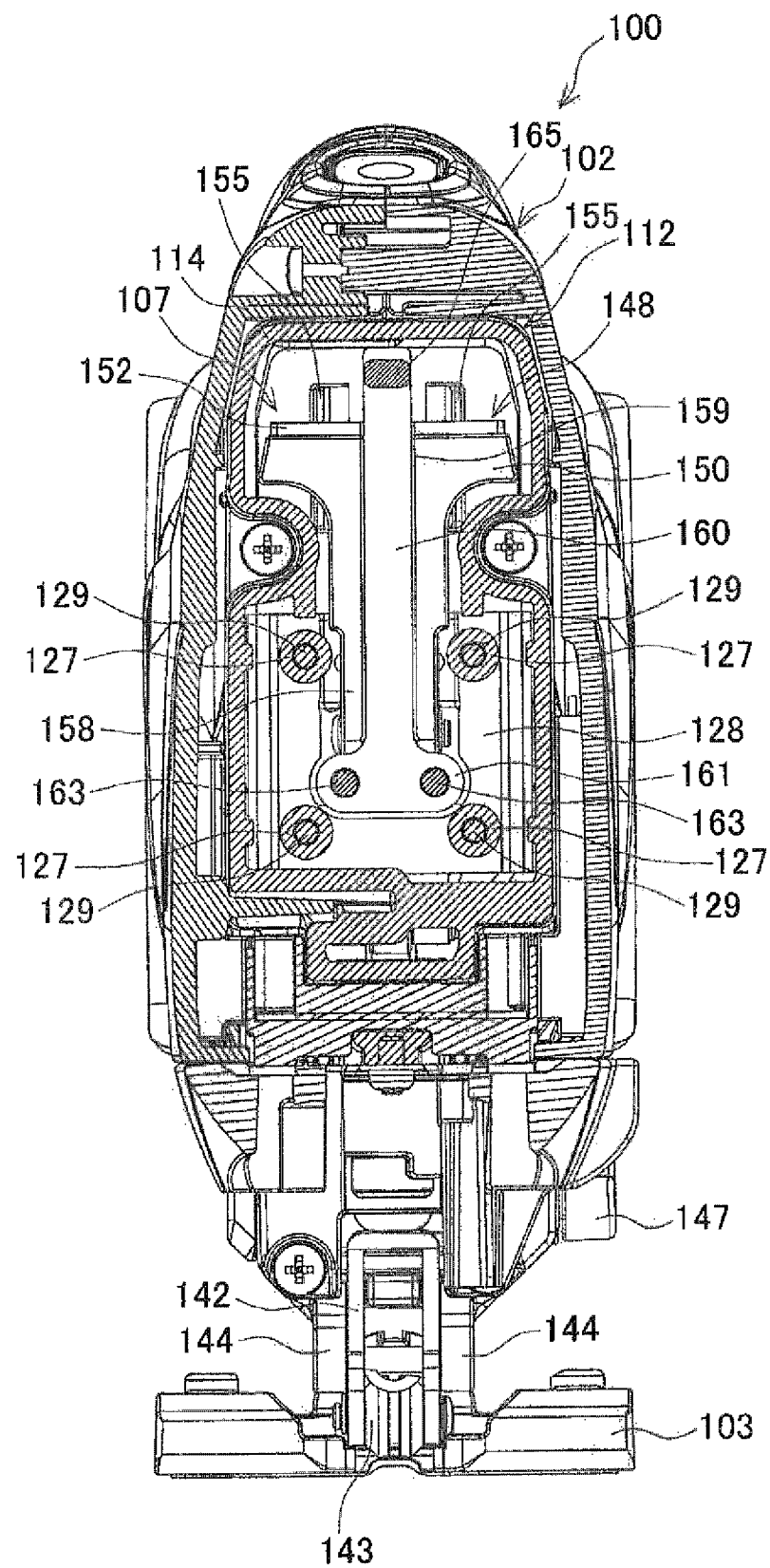
FIG. 6 is an enlarged sectional view taken along line A-A in FIG. 5.

As shown in FIG. 6, the gear housing cover 114 has four bosses 127 protruding from its inner surface, and a guide plate 128 having a U-shape as viewed from the front is fixed to the bosses 127 by screws 129. The slider 123 has bulging portions (not shown) at its both ends, and these bulging portions fit in right and left folded portions 130 of the guide plate 128. The slider 123 is thus supported in the inner housing 112 so that the slider 123 can move vertically. When the gear 118 is rotated and the eccentric pin 120 together with the guide roller 121 makes eccentric motion, vertical displacement of the guide roller 121 is transmitted to the slider 123, and the slider 123 moves vertically via the guide roller 121 accordingly. The gear 118, the eccentric pin 120, the guide roller 121, and the slider 123 form a reciprocating mechanism 131 that converts rotation transmitted from the motor 105 to reciprocating movement of a rod 133 described below.

Figure 7:
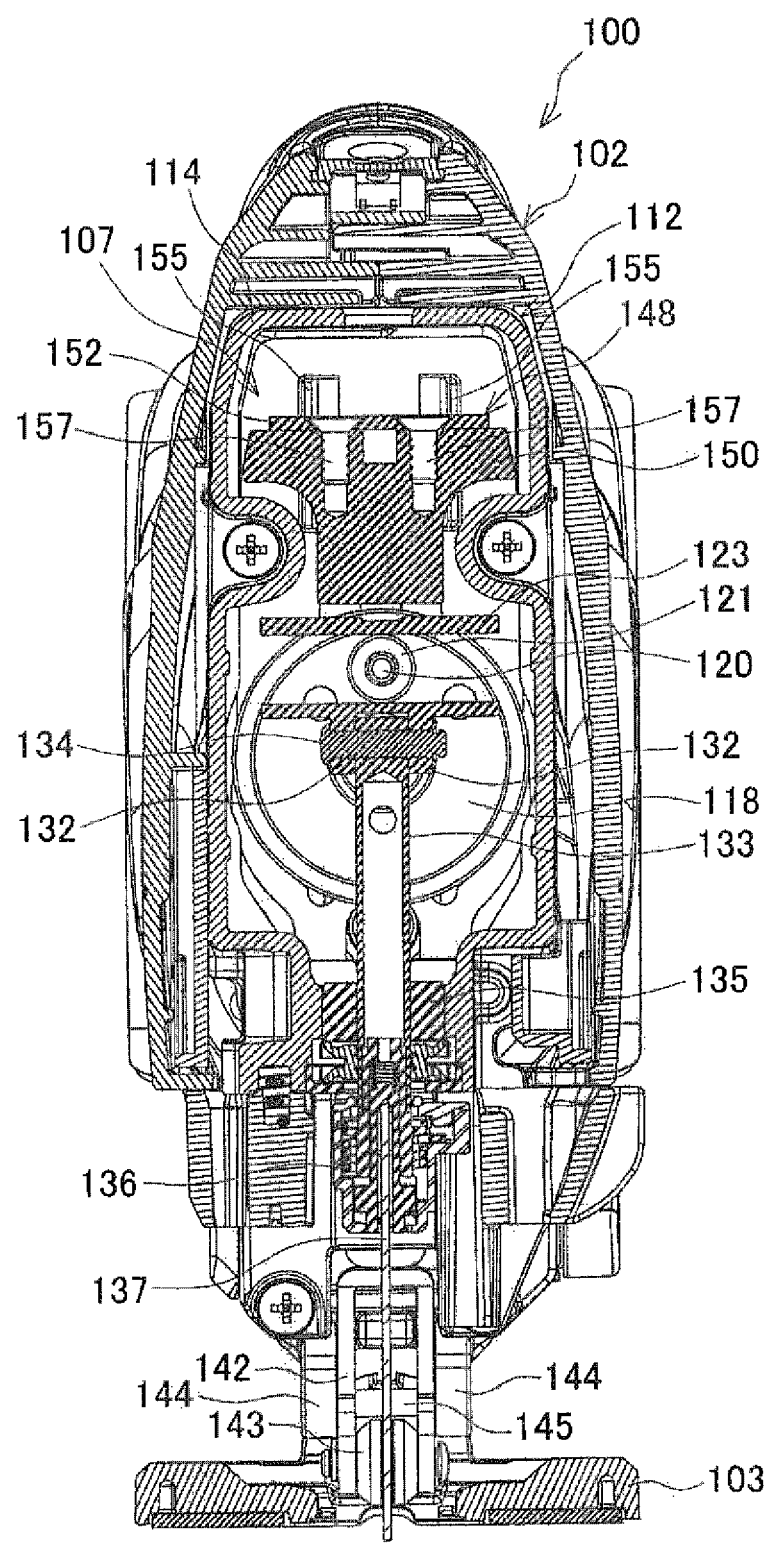
FIG. 7 is an enlarged sectional view taken along line B-B in FIG. 5.

As shown in FIG. 7, a pair of support pieces 132, 132 are provided in the central portion of the lower surface of the slider 123 so as to protrude downward, and the upper end of the rod 133 is coupled between the support pieces 132, 132 by a pin 134. This rod 133 has the shape of a prism. The rod 133 extends through a bush 135 held by the lower part of the gear housing cover 114, and protrudes downward beyond the inner housing 112, so that the upper end of a blade 137 can be attached to a joint portion 136 provided at the lower end of the rod 133.

A restricting roller 138 that restricts forward swinging of the rod 133 is disposed in front of the rod 133. The restricting roller 138 is attached to the lower end of a leaf spring 139 that is fixed by the screws 129 fastening the guide plate 128. The restricting roller 138 constantly presses the rod 133 rearward.

An orbital mechanism 140 is provided rearward of the rod 133. The orbital mechanism 140 longitudinally swings the blade 137 moving vertically together with the rod 133, and thus causes the blade 137 to make elliptic orbital motion. The orbital mechanism 140 includes a cam plate 141 that moves vertically with the movement of the second eccentric portion 126 of the eccentric boss 124 of the gear 118, and a swing arm 142 located below the cam plate 141. The swing arm 142 is a strip-shaped plate having its intermediate portion folded into an inverted U-shape, and supports a back roller 143 at its lower end. The swing arm 142 is supported by a pin 145 between a pair of right and left coupling pieces 144, 144 provided on the coupling portion 115 of the gear housing 113 so that the swing arm 142 can swing longitudinally. In a normal state, as shown in FIG. 11, the swing arm 142 is rotationally biased by the weight of the back roller 143 to the position where the upper end of the swing arm 142 contacts the lower end of the cam plate 141 located at the top dead center. As shown in FIG. 5, as the cam plate 141 moves downward, the cam plate 141 presses down the upper end of the swing arm 142 to swing the back roller 143 forward.

A switch shaft 146 is a semicylindrical shaft that extends through the coupling portion 115 in the lateral direction at a position above the upper end of the swing arm 142. When the switch shaft 146 is operated by a lever 147 provided on the side surface of the coupling portion 115 so that the curved surface of the switch shaft 146 faces downward, the curved surface contacts the upper end of the swing arm 142, thereby restricting swinging of the swing arm 142. On the other hand, when the switch shaft 146 is operated by the lever 147 so that the curved surface of the switch shaft 146 faces upward, the curved surface is separated from the upper end of the swing arm 142, thereby allowing the swing arm 142 to swing.

The eccentric pin 120 is offset in the opposite direction to that in which the eccentric boss 124 is offset. Accordingly, if the switch shaft 146 is switched so as to allow the swing arm 142 to swing, and the rod 133 moves upward, the cam plate 141 moves downward to press down the upper end of the swing arm 142. The back roller 143 thus swings forward and presses the blade 137 forward as the blade 137 moves upward. When the rod 133 moves downward, the cam plate 141 moves upward and is separated from the upper end of the swing arm 142. The back roller 143 thus swings rearward and is separated from the blade 137. The blade 137 that is pressed by the back roller 143 as the blade 137 moves upward thus makes orbital motion in the longitudinal direction.

Figure 8:
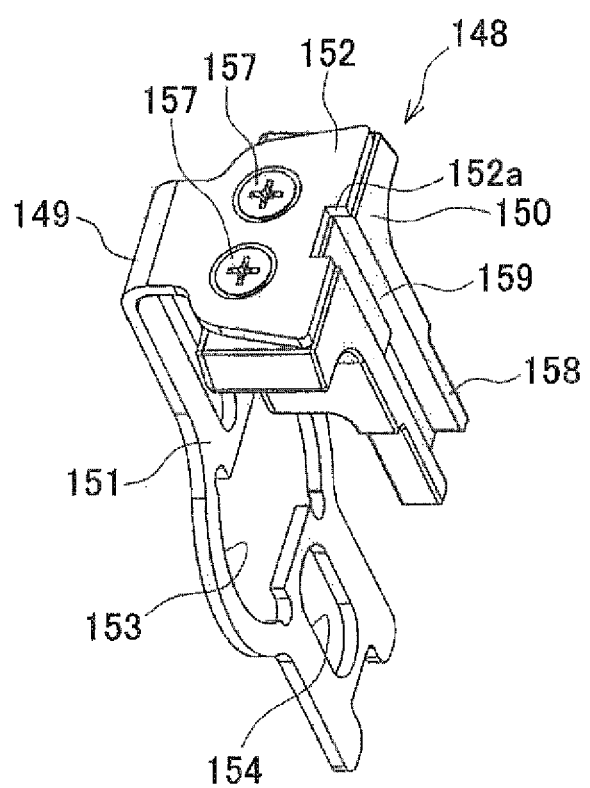
FIG. 8 is a perspective view of a counterweight.

A counterweight 148 is provided in the inner housing 112. The counterweight 148 is formed by a plate 149 provided between the gear 118 and the cam plate 141, and a weight 150 supported by the plate 149. As is also shown in FIGS. 8, 9A, and 9B, the plate 149 has an inverted L-shaped plate that is formed by a vertical cam plate portion 151 and a weight attachment portion 152 protruding forward from the upper end of the cam plate portion 151. The cam plate portion 151 has a cam hole 153 in its central portion. The cam hole 153 has such a vertical width as to allow the first eccentric portion 125 to fit in the cam hole 153, and such a lateral width as to allow the first eccentric portion 125 to make eccentric motion. The cam plate portion 151 has a long hole 154 below the cam hole 153 so that the output shaft 106 extends through the long hole 154.

Figure 10A:
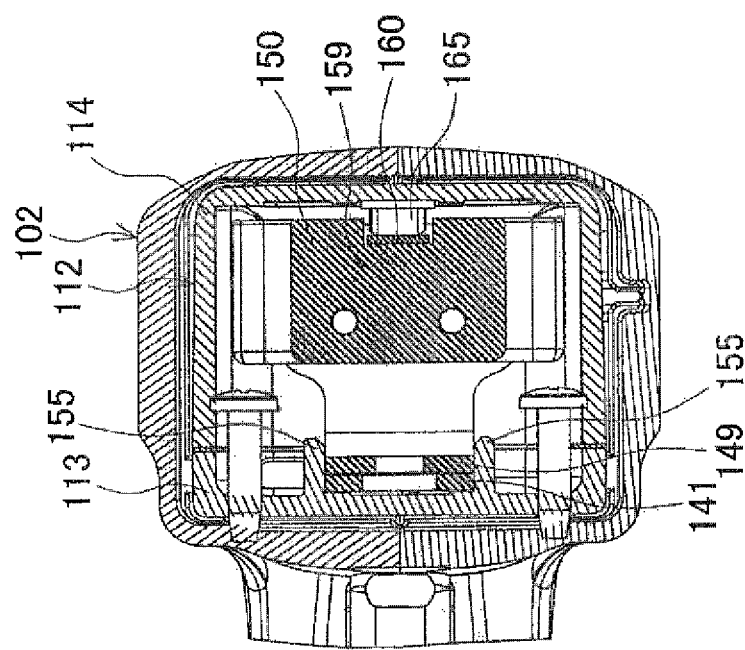
FIG. 10A is an enlarged sectional view taken along line C-C in FIG. 5.
Figure 10B:
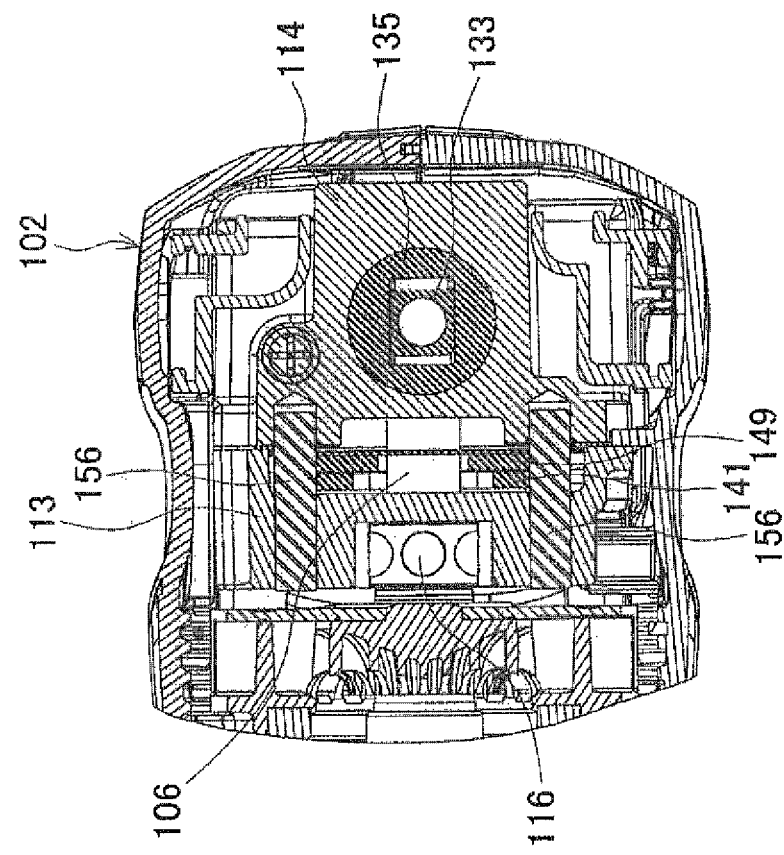
FIG. 10B is an enlarged sectional view taken along line D-D in FIG. 5.

When the gear 118 is rotated and the eccentric boss 124 makes eccentric motion, vertical displacement of the first eccentric portion 125 is transmitted to the cam plate portion 151, and the plate 149 moves vertically. As shown in FIG. 10A, in the region above the gear 118 on the inner surface of the gear housing 113, vertical movement of the cam plate 141 and the plate 149 is guided by a pair of ribs 155, 155 that are formed on the right and left sides of the plates 141, 149 so as to be provided on the inner surface of the gear housing 113. As shown in FIG. 10B, in the region below the output shaft 106, vertical movement of the plates 141, 149 is guided by a pair of right and left coupling pins 156, 156 that couple the gear housing 113 and the gear housing cover 114.

The weight 150 is a metal block body that is attached to the lower surface of the front part of the weight attachment portion 152 of the plate 149 with a pair of right and left screws 157, 157. In the assembled state, the weight 150 is located above the slider 123 located at the top dead center. A suspended portion 158 is formed in the front part of the weight 150 so as to protrude downward in front of the slider 123. This shape can ensure required mass of the weight 150 while reducing the longitudinal dimension of the weight 150. The center of gravity of the counterweight 148 is located immediately above the rod 133, and the overall weight of the counterweight 148 is set so as to be balanced with the total weight of the rod 133, the blade 137, and the slider 123. A vertical groove 159 is formed in the front surface of the weight 150, and a cutout 152a is formed in the center of the front end of the weight attachment portion 152 of the plate 149 so as to be continuous with the groove 159. The upper part of the groove 159 is shallower than the lower part thereof.

A guide plate 160 serving as a counterweight guide is provided in front of the counterweight 148. This guide plate 160 is a strip-shaped plate having such a width that the guide plate 160 fits in the groove 159 of the weight 150. The guide plate 160 has a laterally wide attachment portion 161 at its lower end. The gear housing cover 114 has a pair of small bosses 162, 162 provided on its inner surface between the bosses 127 for screwing the guide plate 128. The attachment portion 161 is fixed at a position below the weight 150 to the pair of small bosses 162, 162 by screws 163, 163. The guide plate 160 is therefore supported at a predetermined interval from the inner surface of the gear housing cover 114 so as to be elastic in the longitudinal direction. The guide plate 160 thus elastically guides the weight 150. A cylindrical rubber pin 165 is disposed between the upper end as a free end of the guide plate 160 and the gear housing cover 114. The rubber pin 165 is held transversely by a receiving seat 164 formed in the inner surface of the gear housing cover 114. The length of the rubber pin 165 is the same as the width of the guide plate 160. This rubber pin 165 line-contacts the upper end of the guide plate 160, thereby applying a preload to the guide plate 160 to elastically press the guide plate 160 against the weight 150. The rubber pin 165 is the preload unit (elastic body) of the present invention.

In the jigsaw 100 configured as described above, the base 103 is placed on a workpiece with the blade 137 being attached to the rod 133, and the trigger 111 is depressed so that the switch 110 is turned on to drive the motor 105. The output shaft 106 is thus rotated, and the gear 118 is rotated at a reduced speed. This rotation of the gear 118 causes the eccentric pin 120 to make eccentric motion to move the slider 123 and the rod 133 vertically via the guide roller 121. The blade 137 thus moves vertically to cut the workpiece.

At this time, the cam plate 141 of the orbital mechanism 140 moves vertically due to the eccentric motion of the eccentric boss 124 of the gear 118. Accordingly, if the switch shaft 146 has been switched to the position where the swing arm 142 is allowed to swing, the swing arm 142 swings longitudinally, and the back roller 143 presses the blade 137 forward as the blade 137 moves upward. When the blade 137 is pressed forward, excessive forward movement of the blade 137 is restricted by the restricting roller 138.

As shown in FIGS. 5 to 7 and FIGS. 11 and 12, the counterweight 148 moves vertically in a symmetrical manner with the rod 133 based on the eccentric motion of the eccentric boss 124. This can suppress vibration and noise generated due to the vertical movement of the rod 133. In particular, in this example, the weight 150 of the counterweight 148 moves vertically while being guided by the guide plate 160. Since the guide plate 160 is elastically pressed against the weight 150 by the rubber pin 165, forward movement of the weight 150 is restricted, and generation of the moment is suppressed. This stabilizes the vertical movement of the weight 150, and can effectively prevent vibration associated with the vertical movement of the counterweight 148. Since the weight 150 moves vertically with the guide plate 160 being fitted in the groove 159, the counterweight 148 is prevented from being shifted in the lateral direction. Moreover, when the counterweight 148 is located at the top dead center as shown in FIG. 11, the rubber pin 165 is located above the position of the lower end of the groove 159 contacting the guide plate 160. The rubber pin 165 can therefore absorb the impact that is exerted when the counterweight 148 moves downward from the top dead center.

As described above, the jigsaw 100 of the above embodiment is provided with the preload unit (rubber pin 165) that presses the guide plate 160 against the counterweight 148. This can effectively prevent vibration resulting from the counterweight 148.

In particular, in the above example, the guide plate 160 is provided in front of the weight 150 that moves vertically, and the guide plate 160 is pressed against the weight 150 by the rubber pin 165 provided in front of the guide plate 160. This structure can achieve satisfactory assembling workability Since the rubber pin 165 that line-contacts the guide plate 160 is used as the preload unit, a preload can be easily applied to the guide plate 160.

Since the guide plate 160 is elastically pressed against the weight 150 by the rubber pin 165, vibration can be effectively suppressed by different natural frequencies of the guide plate 160 and the rubber pin 165 by using a reasonable structure having a small number of parts.

The weight 150 is provided with the groove 159 in which the guide plate 160 is fitted. Thus, the vertical movement of the weight 150 can be guided by the guide plate 160, and further, the counterweight 148 can be prevented from being shifted in the lateral direction.

Since the guide plate 160 having a fixed lower end and a free upper end is pressed against the counterweight 148 by the rubber pin 165, a stable preload can be applied to the guide plate 160.

When the counterweight 148 is located at the top dead center, the rubber pin 165 is located above the position of the lower end of the groove 159 of the weight 150 which contacts the guide plate 160. Accordingly, the buffering effect can be obtained when the counterweight 148 moves downward from the top dead center.

Since the weight 150 has the downwardly protruding suspended portion 158 in its front part, the longitudinal thickness can be reduced, and a compact configuration can be achieved.

The above embodiment uses the rubber pin as the preload unit. The shape of the rubber pin is not limited to the cylinder, and a rubber pin having a quadrilateral or polygonal transverse section etc. may be used. Instead of using the single elastic body, a plurality of elastic bodies having different natural frequencies (rubber, coil spring, leaf spring, etc.) may be combined to apply a preload to the guide member. By using such a plurality of types of elastic bodies, vibration can be more effectively suppressed by the different natural frequencies.

In the above embodiment, the preload unit applies a preload to the guide member such as the guide plate to press the guide member against the counterweight. However, the present invention is not limited to this. The counterweight may be provided with the preload unit, and the preload unit may apply a preload to the counterweight to relatively press the fixed guide member to the counterweight.

The specific structure of the counterweight is not limited to the above embodiments, and may be modified as appropriate. For example, the suspended portion of the weight may be eliminated, the counterweight may be formed by a plurality of parts, or a ridge that is fitted in a long hole formed in the guide member may be provided instead of the groove so as to achieve guiding of the vertical movement of the weight and to prevent shifting of the counterweight in the lateral direction.

Other structures of the jigsaw are not limited to the above embodiments. For example, a plurality of gears may be provided, the handle on the upper side of the jigsaw may be eliminated and the motor accommodating portion may be used also as a handle, or a commercial power source may be used instead of the battery pack.

The present invention is not limited to the jigsaws, and is also applicable to other reciprocating cutting tools such as reciprocating saws as long as they include a slide member, a counterweight, and a guide member that guides reciprocating movement of the counterweight.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A reciprocating cutting tool, comprising:
   a motor;
   a rod having a blade attached to the rod;
   a reciprocating mechanism that converts rotation transmitted from the motor to reciprocating movement of the rod to reciprocate the blade;
   a counterweight that reciprocates in a direction of the reciprocating movement of the rod outside a range of the reciprocating movement of the rod and the blade;
   a counterweight guide that guides the counterweight; and
   a preload unit that presses the counterweight guide against the counterweight,
   wherein at least a part of the counterweight is arranged above the rod along a longitudinal direction of the rod, and
   the counterweight reciprocates independently of the reciprocating movement of the rod which is produced by the reciprocating mechanism.

2. The reciprocating cutting tool according to claim 1, wherein
   the counterweight is formed by a plate that reciprocates parallel to the rod reciprocating in a vertical direction and a weight that is attached to the plate, and the counterweight guide is provided in front of the weight and is pressed against the weight by the preload unit disposed in front of the counterweight guide.

3. The reciprocating cutting tool according to claim 2, wherein
   the weight has a groove in which the counterweight guide is fitted.

4. The reciprocating cutting tool according to claim 2, wherein
   the rod and the counterweight reciprocate in the vertical direction, and the weight has a suspended portion formed in its front part so as to protrude downward.

5. The reciprocating cutting tool according to claim 1, wherein
   the preload unit is an elastic body that line-contacts the counterweight guide.

6. The reciprocating cutting tool according to claim 5, wherein
   one end of the counterweight guide in a direction of the reciprocating movement of the counterweight is fixed and the other end thereof is a free end, and the counterweight guide is pressed against the counterweight by the elastic body.

7. The reciprocating cutting tool according to claim 5, wherein
   the rod and the counterweight reciprocate in a vertical direction, and when the counterweight is located at a top dead center, the elastic body is located above a position of a lower end of a weight contacting the counterweight guide.

8. The reciprocating cutting tool according to claim 1, wherein
   the preload unit comprises a plurality of elastic bodies, the plurality of elastic bodies having a different shapes or different natural frequencies from each other.

9. The reciprocating cutting tool according to claim 8, wherein
   the counterweight guide has elasticity.

* * * * *